(12) United States Patent
Youssef

(10) Patent No.: US 10,816,674 B2
(45) Date of Patent: Oct. 27, 2020

(54) ADAPTIVE LOW POWER MODE FOR GNSS RECEIVER

(71) Applicant: Sony Corporation, Tokyo (JP)

(72) Inventor: Mohamed Youssef, San Diego, CA (US)

(73) Assignee: Sony Corporation, Tokyo (JP)

(*) Notice: Subject to any disclaimer, the term of this patent is extended or adjusted under 35 U.S.C. 154(b) by 345 days.

(21) Appl. No.: 15/722,864

(22) Filed: Oct. 2, 2017

(65) Prior Publication Data

US 2019/0101654 A1 Apr. 4, 2019

(51) Int. Cl.
*G01S 19/34* (2010.01)
*G01S 19/49* (2010.01)
*G01C 21/00* (2006.01)

(52) U.S. Cl.
CPC .............. *G01S 19/34* (2013.01); *G01C 21/00* (2013.01); *G01S 19/49* (2013.01)

(58) Field of Classification Search
CPC .................................. G01S 19/34; G01S 19/49
See application file for complete search history.

(56) References Cited

U.S. PATENT DOCUMENTS

| 9,182,238 B2 | 11/2015 | Lau et al. |
| 9,641,973 B2 | 5/2017 | Venkataramani et al. |
| 2005/0212699 A1* | 9/2005 | Horslund ............... G01S 19/24 342/357.63 |
| 2008/0150797 A1* | 6/2008 | Jia ........................... G01S 19/34 342/357.74 |
| 2011/0106373 A1* | 5/2011 | Hergesheimer ....... B60R 25/102 701/31.4 |

* cited by examiner

*Primary Examiner* — Marc Anthony Armand
(74) *Attorney, Agent, or Firm* — John L. Rogitz

(57) ABSTRACT

GNSS receiver duty cycling is based on context awareness. Context awareness can be received signal quality, targeted navigation performance, and external information extracted from other sensors or being received from other sources such as cellular system, Wi-Fi, camera, LiDAR, and Bluetooth Low Energy (BLE).

13 Claims, 4 Drawing Sheets

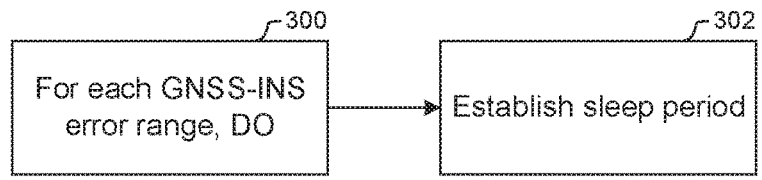
FIG. 3  Set up
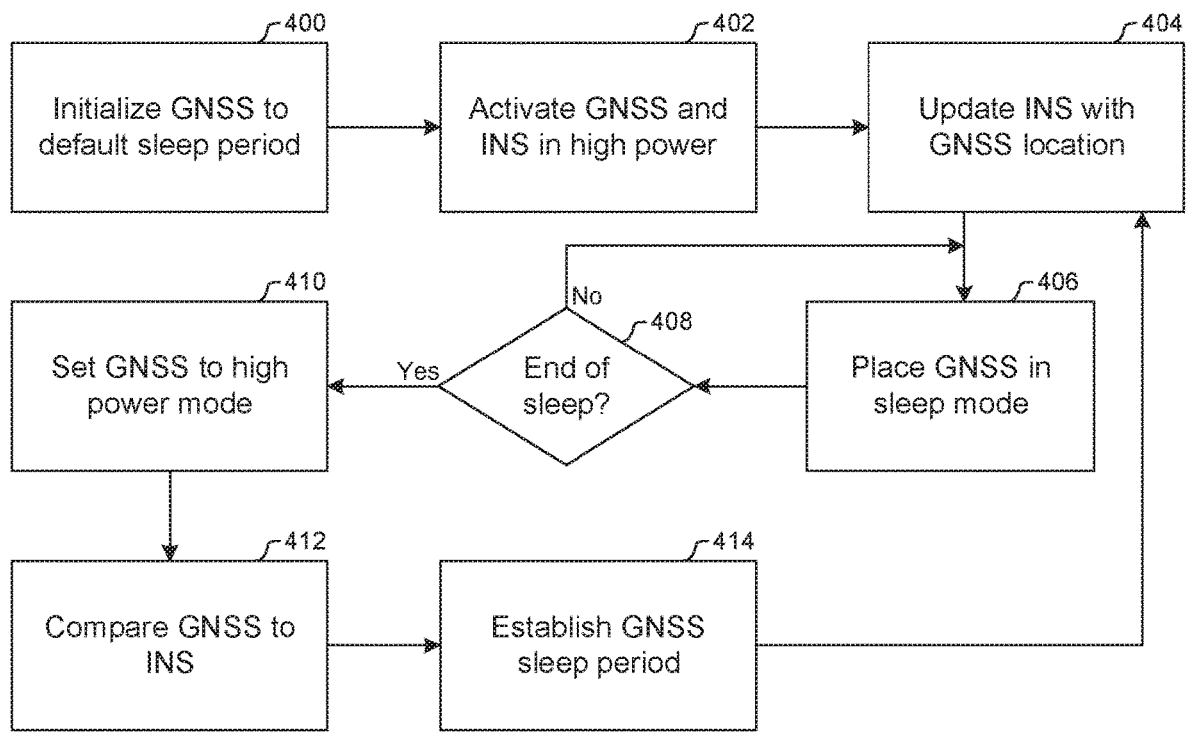
FIG. 4

ADAPTIVE LOW POWER MODE FOR GNSS RECEIVER

FIELD

The present application relates to technically inventive, non-routine solutions that are necessarily rooted in computer technology and that produce concrete technical improvements.

BACKGROUND

Location-awareness is an integrated feature in many computer applications. In the age of connected devices, satellite location is considered the primary source to provide global scale location-awareness. That is, the primary location source for most connected devices is a Global Navigation Satellite System (GNSS) receiver. GNSS is a generic term for satellite navigation systems that provide autonomous geo-spatial positioning with global coverage, including regional systems such global positioning system (GPS), GLONASS, Galileo, and Beidou.

SUMMARY

As understood herein, because many connected devices are battery powered, it is desirable that a GNSS receiver consume as little power as possible. To this end, GPS receivers have been introduced that cycle between low power and high power modes, potentially by estimating a sleep interval for the receiver based on a planned navigation route and the speed of the GPS receiver and energizing the receiver at expected intersection locations. As further understood herein, such approaches to reducing power consumption in a GNSS receiver tend to be static, in that a sleep mode is established based on a rule that may or may not be appropriate for the context of the device in which the GNSS receiver operates.

Accordingly, present principles transition a GNSS receiver to a low power or sleep mode based on the received signal and/or navigation quality and/or outside information from another sensor or device that is representative of the operational context of the device. As an example, a GNSS receiver is transitioned to a sleep mode responsive to a high estimated accuracy of an inertial system such as when an updated position from the GNSS receiver is close to the predicted position of the inertial system. The sleep interval adaptively changes based on the quality of overall positioning performance computed by the GNSS and/or external navigation method (such as an inertial navigation system).

Thus, an integrated navigation system uses a GNSS receiver and at least one other sensor or system to collaborate to reduce the power consumed by GNSS chip while maintaining a targeted overall navigation performance.

A system accordingly includes at least one global navigation satellite system (GNSS) device, at least one location device different from the location device, and at least one processor establishing a low power mode period of the GNSS device responsive to identifying a difference in indicated locations between the GNSS device and the location device.

The GNSS device may be a global positioning system (GPS) device and the location device may be an inertial navigation system (INS). The processor can be part of the GNSS device.

In example implementations, the processor is configured with instructions to program the processor to receive a first location from a GNSS receiver of the GNSS device, and to receive a second location from the location device. The processor is programmed to identify a difference between the first and second locations, and based at least in part on the difference, establish a length of a low power mode period for the GNSS device.

In specific examples, the processor may be programmed to, at an end of the low power mode period, establish a high power mode in the GNSS device to receive the first location. Prior to updating the location device, the processor is programmed to receive the second location from the location device to identify the difference and establish the length of the low power mode period for the GNSS device. The processor may be further programmed to send information from the GNSS receiver to the location device to update the location device, and to establish the lower power mode in the GNSS device for the low power mode period.

In another aspect, an article of manufacture includes at least one computer storage that is not a transitory signal and that in turn includes instructions executable by at least one processor to receive global navigation satellite system (GNSS) signals from a GNSS receiver, and to identify at least one navigation metric based on the received signals. The instructions are executable to establish a low power mode period length for the GNSS receiver based at least in part on the signal quality. Also, the instructions are executable to establish a low power mode for a GNSS device associated with the GNSS receiver, and at an end of the low power mode period, establish a high power mode for the GNSS device.

In another aspect, a method includes receiving an indicated location from a global navigation satellite system (GNSS) receiver, and receiving an indicated location or a location uncertainty metric from a location device other than the GNSS receiver. The method also includes establishing a length of a low power mode period for the GNSS receiver based at least in part on a relationship between the indicated locations or direction.

The details of the present disclosure, both as to its structure and operation, can be best understood in reference to the accompanying drawings, in which like reference numerals refer to like parts, and in which:

BRIEF DESCRIPTION OF THE DRAWINGS

FIG. 3 is a flow chart of example logic for establishing sleep criteria based on indicated navigation accuracy:

FIG. 4 is a flow chart of example logic for establishing a sleep state of a GNSS receiver based on actual GNSS accuracy.

DETAILED DESCRIPTION

Figure 1:
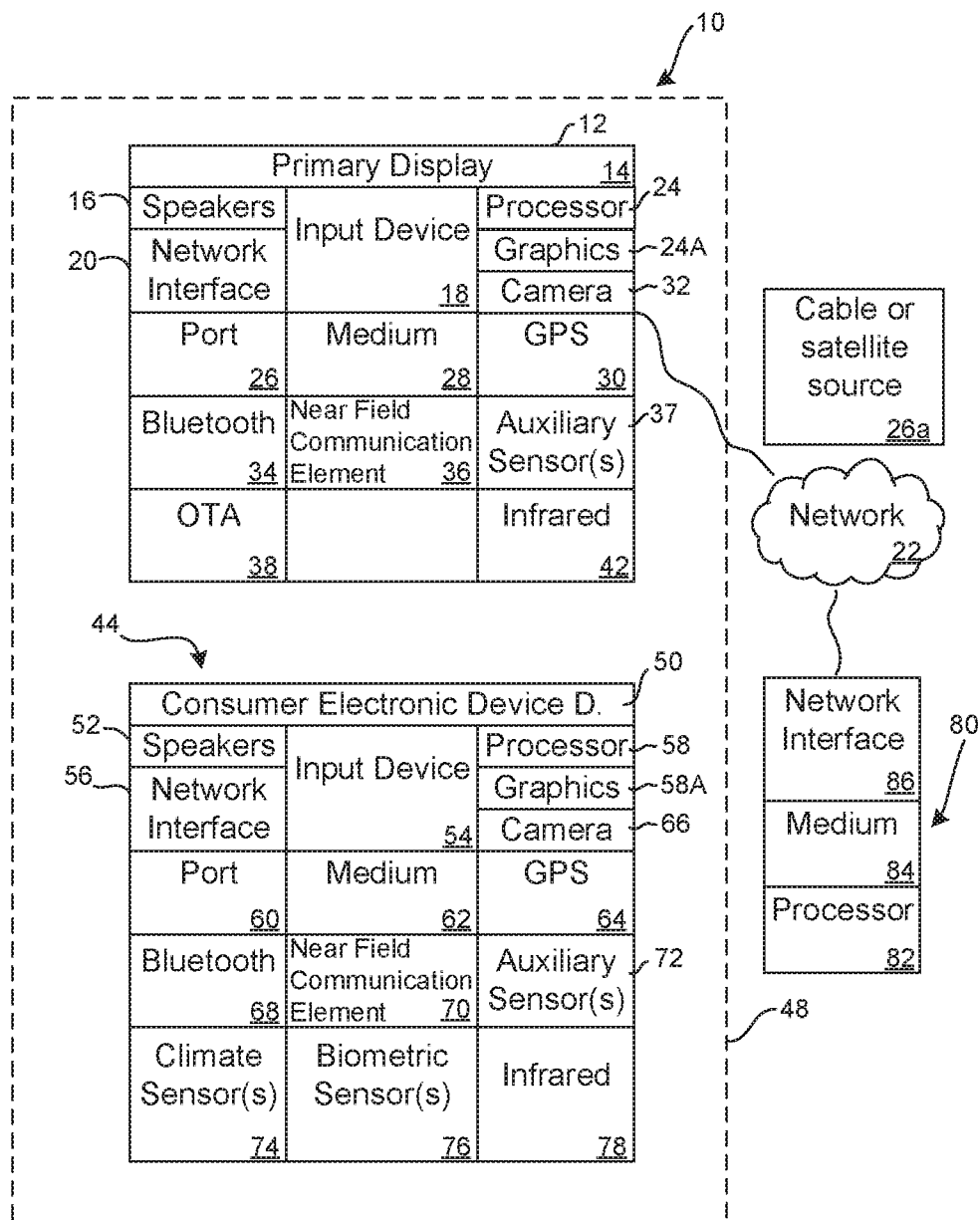
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other portable devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flowcharts and user interfaces herein can include various sub-routines, procedures, etc. Without limiting the disclosure, logic stated to be executed by a particular module can be redistributed to other software modules and/or combined together in a single module and, or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A. B, or C" and "a system having at least one of A, B, C") includes systems that have A alone, B alone, C alone, A and B together, A and C together, B and C together, and/or A. B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet-enabled refrigerator, washer, or dryer. The AVDD 12 alternatively may also be a computerized Internet-enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a processed or raw motion sensor data such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
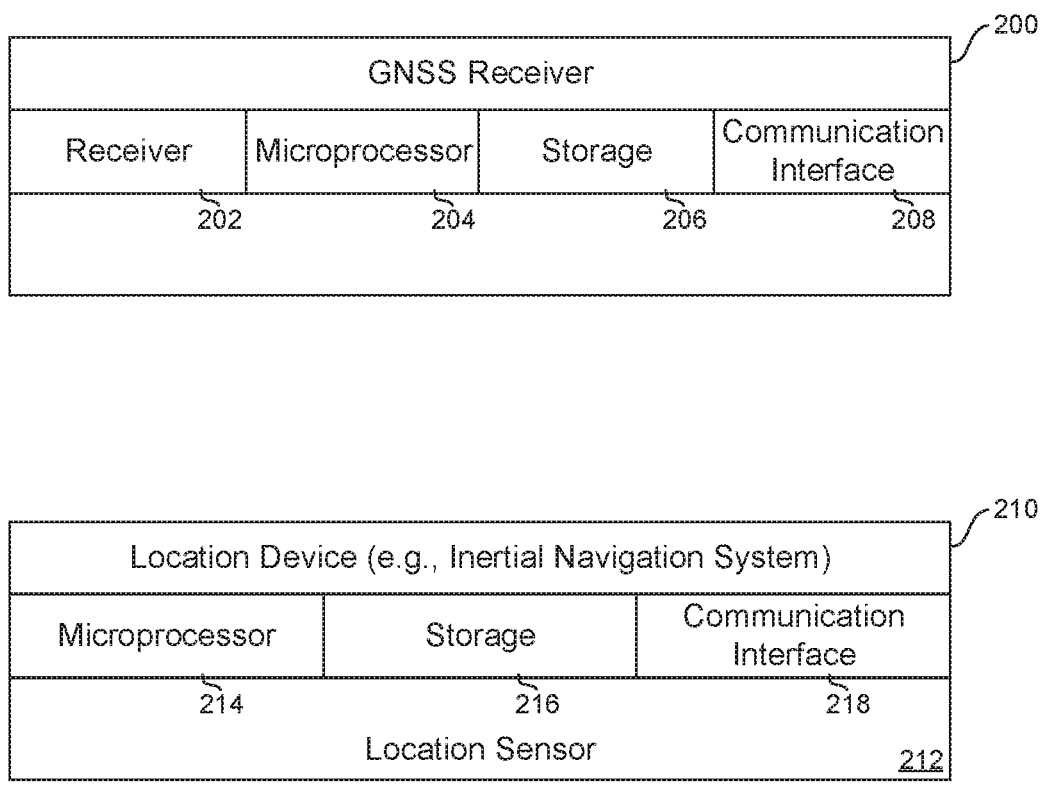
FIG. 2 is a block diagram of an example GNSS receiver and a secondary location device such as an inertial navigation system (INS)

FIG. 2 shows a GNSS receiver device 200 that may include appropriate components described above and that may be used in any of the devices discussed herein. Thus, the GNSS receiver device 200 may include a GNSS receiver 202 that receives satellite navigation signals and one or more internal processors 204, computer memories 206, and wired or more typically wireless communication interfaces such as Bluetooth transceivers. Bluetooth low energy (BTE) transceivers, Wi-Fi transceivers, etc. to communicate with a separate location device 210 such as an inertial navigation system (INS) or IMU (Inertial Measurement Unit). The INS/IMU 210 may include one or more motion sensors 212 such as accelerometers, gyroscopes, etc., and one or more processors 214, computer memories 216, and communication interfaces 218.

Figure 5:
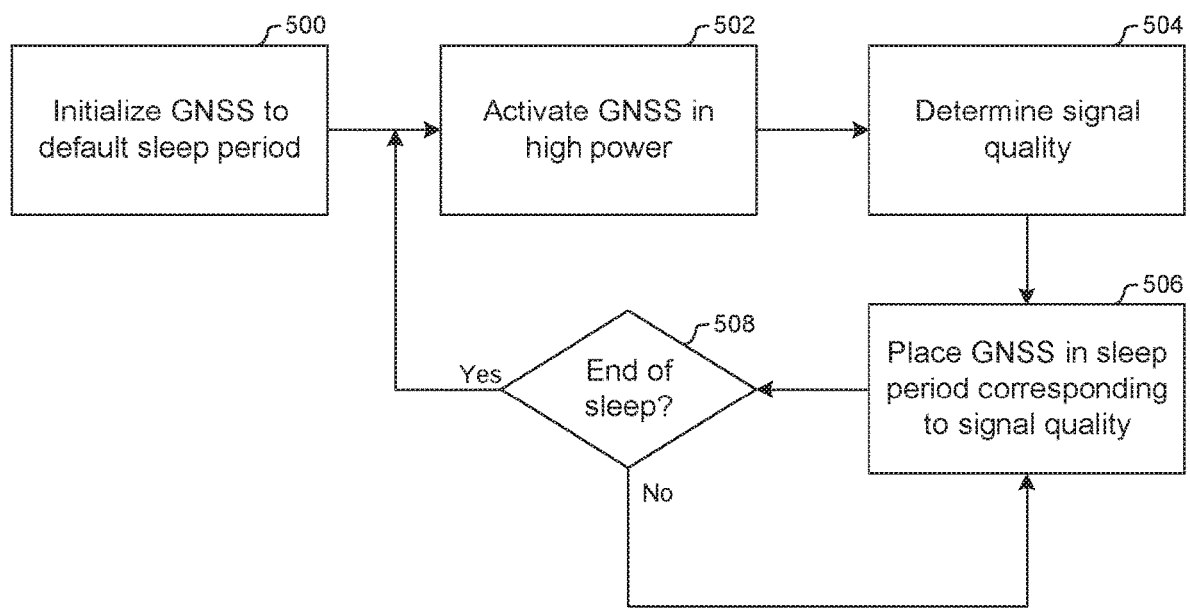
FIG. 5 is a flow chart of example logic for establishing a sleep state of a GNSS receiver based on GNSS received signal quality.

FIGS. 3-5 illustrate example logic that typically may be implemented by the GNSS processor 204 accessing instructions on the GNSS computer memory 206 and information from the INS/IMU 210 received through the communication interface 208.

Commencing at block 300 of FIG. 3, in one embodiment, for each one of plural error ranges between GNSS reported location and the location reported by the location device 210, a corresponding sleep period is established at block 302. Table 1 below presents a non-limiting example:

| Error | Sleep period |
| --- | --- |
| 0 meters-5 meters | long (e.g., ten minutes) |
| 5.1 meters-10 meters | shorter (e.g., eight minutes) |
| 10.1 meters-20 meters | shorter still (e.g., two minutes) |
| 20 meters-1 kilometers | shortest (e.g., ten seconds) |

Thus, it will be appreciated that in general, the smaller the error between reported locations from the GNSS device 200 and location device 210, the longer the GNSS device 200 is placed in the low power mode.

Now referring to FIG. 4, at block 400 the GNSS device 200 is initialized to a default sleep period, also referred to herein as a "low power mode period". Proceeding to block 402, both the GNSS device 200 and location device 210 are activated in full power mode so as to receive location signals and produce location output. If desired, at block 404 the location device 210 may be updated with the typically more accurate GNSS location output. Then at block 406 the GNSS device 200 is transitioned to low power mode, in which, for example, certain components of the device 200 are deactivated. Those components may include the receiver 202, portions of the processor 204, etc.

When it is determined that the sleep period is at an end at state 408, the logic proceeds to block 410 to transition the GNSS device 200) back to the high power mode, and then compare the location output from the GNSS to the location output by the location device 210 for the same time as the location was reported for by the GNSS device 200. Based on this comparison, the length of the sleep period (low power mode period) for the GNSS device is established at block 414, e.g., by accessing the correlation defined in FIG. 3 and exemplified in Table 1 above. The logic then loops back to block 404. Note that a different power mode can be triggered as well if a change in direction from sensors has been detected.

FIG. 5 illustrates an alternate embodiment. At block 500 the GNSS device 200 is initialized to a default sleep period, also referred to herein as a "low power mode period". Proceeding to block 502, the GNSS device 200 is activated in full power mode so as to receive location signals and produce location output.

Moving to block 504, received satellite signal quality can be determined by, e.g., the GNSS processor 204. In example embodiments, this may be done by determining received signal strength, and correlating signal strength to a quality metric. Or, bit error rate (BER) may be used and correlated to signal quality. Yet again, signal quality may be determined based on a difference between a location indicated by the GNSS receiver and a location indicated by the location device as disclosed above in reference to FIG. 4.

Signal quality can be correlated to a length of the sleep period similarly to the correlation described in FIGS. 3 and 4. In examples, this correlation may be done by table lookup, correlated, or by acquiring different GNSS constellation or by receiving Assisted GNSS information or by using augmented GNSS signals or by receiving other RF location information. Longer sleep periods are correlated to better signal quality and poorer signal qualities are correlated to shorter sleep periods. At block 506, the GNSS device 200 is placed in the low power mode for a period correlated with the signal quality determined at block 504. When the sleep period has elapsed, the logic loops back to block 502 to transition the GNSS device 200 to the high power mode to obtain updated location information.

While particular techniques are herein shown and described in detail, it is to be understood that the subject matter which is encompassed by the present application is limited only by the claims.

What is claimed is:
1. A system comprising:
at least one global navigation satellite system (GNSS) device;
at least one location device different from the GNSS device; and at least one processor configured for establishing a low power mode period of the GNSS device responsive to identifying a difference in indicated locations between the GNSS device and the location device.

2. The system of claim 1, wherein the GNSS device is a global positioning system (GPS) device.

3. The system of claim 1, wherein the location device is an inertial navigation system (INS).

4. The system of claim 1, wherein the processor is part of the GNSS device.

5. The system of claim 1, wherein the processor is configured with instructions to program the processor to:

receive a first location from a GNSS receiver of the GNSS device;

receive a second location from the location device;

identify a difference between the first and second locations; and based at least in part on the difference, establish a length of a low power mode period for the GNSS device.

6. The system of claim 5, wherein the processor is configured with instructions to program the processor to:

at an end of the low power mode period, establish a higher power mode in the GNSS device to receive the first location;

prior to updating the location device, receive the second location from the location device to identify the difference and establish the length of the lower power mode period for the GNSS device;

send information from the GNSS receiver to the location device to update the location device; and establish the lower power mode in the GNSS device for the low power mode period.

7. A method, comprising:

receiving an indicated location from a global navigation satellite system (GNSS) receiver;

receiving an indicated location from a location device other than the GNSS receiver;

establishing a length of a low power mode period for the GNSS receiver based at least in part on a relationship between the indicated locations; and energizing the GNSS receiver in a low power mode according to the length of the low power mode period.

8. The method of claim 7, wherein the GNSS device is a global positioning system (GPS) device.

9. The method of claim 7, wherein the location device is an inertial navigation system (INS).

10. The method of claim 7, comprising:

receiving a first location from the GNSS receiver of the GNSS device;

receiving a second location from the location device;

identifying a difference between the first and second locations; and based at least in part on the difference, establishing the length of the low power mode period for the GNSS receiver.

11. The method of claim 10, comprising:

at an end of the low power mode period, establishing a high power mode in the GNSS device to receive the first location;

prior to updating the location device, receiving the second location from the location device to identify the difference and establish the length of the low power mode period for the GNSS receiver.

12. The method of claim 11, comprising:

sending information from the GNSS receiver to the location device to update the location device.

13. The method of claim 12, comprising:

establishing the lower power mode in the GNSS receiver for the low power mode period.

* * * * *